United States Patent
Bahar et al.

(10) Patent No.: US 9,457,324 B2
(45) Date of Patent: Oct. 4, 2016

(54) ACTIVE COMPONENTS AND MEMBRANES FOR ELECTROCHEMICAL COMPRESSION

(71) Applicant: Xergy Incorporated, Georgetown, DE (US)

(72) Inventors: Bamdad Bahar, Georgetown, DE (US); William Paul Parmelee, Seaford, DE (US); Steven K Naugler, Hockessin, DE (US)

(73) Assignee: Xergy LTD, London (GB)

( * ) Notice: Subject to any disclaimer, the term of this patent is extended or adjusted under 35 U.S.C. 154(b) by 0 days.

(21) Appl. No.: 13/943,619

(22) Filed: Jul. 16, 2013

(65) Prior Publication Data
US 2014/0014518 A1  Jan. 16, 2014

Related U.S. Application Data

(60) Provisional application No. 61/672,179, filed on Jul. 16, 2012.

(51) Int. Cl.

| | |
|---|---|
| *B01D 71/66* | (2006.01) |
| *B01D 61/42* | (2006.01) |
| *B01D 67/00* | (2006.01) |
| *B01D 69/14* | (2006.01) |
| *B01D 71/82* | (2006.01) |

(Continued)

(52) U.S. Cl.
CPC ............. *B01D 71/66* (2013.01); *B01D 61/427* (2013.01); *B01D 67/0002* (2013.01); *B01D 67/0079* (2013.01); *B01D 69/148* (2013.01); *B01D 71/82* (2013.01); *H01M 8/1088* (2013.01); *B01D 71/027* (2013.01); *B01D 71/22* (2013.01); *B01D 71/28* (2013.01); *B01D 2325/14* (2013.01); *H01M 2300/0082* (2013.01); *Y02E 60/521* (2013.01); *Y02P 70/56* (2015.11)

(58) Field of Classification Search
USPC ........................................... 524/80; 204/630
See application file for complete search history.

(56) References Cited

U.S. PATENT DOCUMENTS

| | | | |
|---|---|---|---|
| 1,925,281 A | 3/1934 | Ranque | |
| 2,913,511 A | 11/1959 | Grubb, Jr. | |

(Continued)

FOREIGN PATENT DOCUMENTS

WO        2008007108 A1      1/2008

OTHER PUBLICATIONS

"Engineering a Membrane Electrode Assembly," John W. Weidner et al., The Electrochemical Society Interface, Winter, 2003, pp. 40-43.

(Continued)

*Primary Examiner* — Peter D Mulcahy
*Assistant Examiner* — Henry Hu
(74) *Attorney, Agent, or Firm* — Invention To Patent Services; Alex Hobson (57) ABSTRACT

A compound membrane for use in electrochemical devices is disclosed. The compound membrane has of proton-conducting polymer cast in a porous media having dispersed therein at least one active ingredients. It supplies considerably improved performance data in comparison to known membranes. The compound membrane electrode can be produced by treating proton-conducting polymers with acetone to obtain polymer pulp, then sulfonating the polymer pulp, combining one or more active ingredients with the polymer pulp and casting the polymer pulp to obtain the membrane.

6 Claims, 5 Drawing Sheets

US 9,457,324 B2
Page 2

(51) Int. Cl.
*H01M 8/10* (2016.01)
*B01D 71/02* (2006.01)
*B01D 71/22* (2006.01)
*B01D 71/28* (2006.01)

(56) References Cited

U.S. PATENT DOCUMENTS

| | | | |
|---|---|---|---|
| 3,432,355 | A | 3/1969 | Niedrach et al. |
| 3,489,670 | A | 1/1970 | Maget |
| 4,118,299 | A | 10/1978 | Maget |
| 4,402,817 | A | 9/1983 | Maget, Jr. |
| 4,523,635 | A | 6/1985 | Nishizaki et al. |
| 4,593,534 | A | 6/1986 | Bloomfield |
| 4,829,785 | A | 5/1989 | Hersey |
| 5,024,060 | A | 6/1991 | trusch |
| 5,547,551 | A | 8/1996 | Bahar et al. |
| 5,599,614 | A | 2/1997 | Bahar et al. |
| 5,635,041 | A | 6/1997 | Bahar et al. |
| 5,746,064 | A | 5/1998 | Tsenter |
| 5,768,906 | A | 6/1998 | Tsenter |
| 5,900,031 | A | 5/1999 | Bloomfield |
| 5,976,724 | A | 11/1999 | Bloomfield |
| 5,993,619 | A | 11/1999 | Bloomfield et al. |
| 6,068,673 | A | 5/2000 | Bloomfield |
| 6,167,721 | B1 | 1/2001 | Tsenter |
| 6,254,978 | B1 | 7/2001 | Bahar et al. |
| 6,321,561 | B1 | 11/2001 | Magel, Jr. |
| 6,425,440 | B1 | 7/2002 | Tsenter et al. |
| 6,553,771 | B2 | 4/2003 | Tsenter |
| 6,635,384 | B2 | 10/2003 | Bahar et al. |
| 2002/0066277 | A1 | 6/2002 | Tsenter |
| 2003/0155252 | A1 | 8/2003 | Juda et al. |
| 2003/0196893 | A1 | 10/2003 | Mcelroy et al. |
| 2006/0230765 | A1 | 10/2006 | Fedorov et al. |
| 2006/0254286 | A1 | 11/2006 | Johnson et al. |
| 2008/0187794 | A1 | 8/2008 | Weingaetner |
| 2009/0308752 | A1 | 12/2009 | Evans et al. |
| 2010/0196790 | A1* | 8/2010 | Kawakami ............ 429/483 |
| 2010/0239946 | A1* | 9/2010 | Miyachi ............ B29C 41/28 429/483 |
| 2013/0052530 | A1* | 2/2013 | Kitaguchi ............ H01M 4/13 429/211 |
| 2014/0027304 | A1* | 1/2014 | Bahar et al. ............ 205/637 |

OTHER PUBLICATIONS

Technical Specifications for "HOGEN Hydrogen Generation Systems," Proton Energy Systems, Inc., Oct. 2008, 2 pages.

"Teledyne Titan(TM) HM Generator Series Hydrogen/Oxygen Gas Systems," Teledyne Energy Systems, Inc., Jun. 2007, 2 pages.

"A Comparative Study of Water as a Refrigerant with Some Current Refrigerants", International Journal of Energy Research, Int. J. energy res. 2005: 29.947-959.

"Electrochemical Compressors From Maget to Today", D. Bloomfield, Analytic Energy Systems, LLC, ChevronTexaco, Oct. 31, 2002.

* cited by examiner

- MEM C from original data
- NR211 35BC GDE low N2 tst 14
- Mem C 35BA no N2 tight bolts tst 17
- .7 mil ePTFE PFSA imb test
- .7 mil ePTFE PFSA imb tst 23
- .7 mil ePTFE PSSA imb
- mem C 35 BC GDE test 5 20130603
- Mem C no N2 snugged bolts tst 16
- Mem C 35BA GDL no N2 very tight bolts tst 18
- .7 mil ePTFE PFSA ext hyd
- .7 mil ePTFE PFSA+5A tst 24
- .7 mil ePTFE PSSA ext hyd

ACTIVE COMPONENTS AND MEMBRANES FOR ELECTROCHEMICAL COMPRESSION

CROSS REFERENCE TO RELATED APPLICATIONS

This application claims the benefit of U.S. Provisional Patent Application No. 61/672,179 filed on Jul. 16, 2012, which is incorporated by reference in its entirety.

BACKGROUND OF THE INVENTION

1. Field of the Invention

The invention relates to the technical field of electrochemistry and describes a compound membrane for electrochemical devices. Furthermore, a process for producing the compound membrane and its use are described.

2. Background

In some general aspects, an electrochemical device includes an electrochemical compressor through which a working fluid that includes a component that primarily acts as an electrochemically-active component flows; a sealed vessel in which the electrochemical compressor is housed; an inlet conduit for passing working fluid into the vessel; and an outlet conduit for passing fluid out of the vessel. The working fluid that leaks from the electrochemical compressor is contained within the vessel. An electrochemical compressor is disclosed in U.S. patent application Ser. No. 12/626,416 entitled "Electrochemical Compressor and Refrigeration System," filed on Nov. 25, 2009, which is hereby incorporated by reference in its entirety.

Implementations can include one or more of the following features. For example, the electrochemical compressor can include one or more electrochemical cells. Each electrochemical cell includes an anode, a cathode, and an electrolytic membrane between and in intimate electrical contact with the cathode and the anode to pass the working fluid. The membrane is used as the electrolyte and at the same time as the separator to separate the anode from the cathode.

The electrolytic membrane preferably comprises proton-conducting polymer materials. These materials will hereinafter also be referred to as ionomers for short. Some existing products include Nafion® by DuPont. Other suitable ion-conducting membranes are described by O. Savadogo in "Journal of New Materials for Electrochemical Systems" I, 47-66 (1998).

The energy efficiency of the electrochemical devices depends on the various factors such as available surface area of the anode and the cathode, the thickness of the membranes, the current density and operating voltage applied to the cells from the power supply. Further, the life of the membrane depends on the chemical properties of the membranes. Any improvement in efficiency related to compressor performance can have significant benefits in terms of energy savings and thus have significant positive environmental impact. It was therefore an object of the present invention to provide a membrane which overcomes the disadvantages of the prior art and, in particular, has an improved construction concept.

SUMMARY OF THE INVENTION

The invention is directed to a compound membrane for use in electrochemical applications. In one embodiment, a compound membrane comprises a proton-conducting polymer cast is a porous media having dispersed therein at least one active ingredients. The proton-conducting polymer may be any suitable ion conducting polymer including one of PolyStyrene Sulfonic Acid (PSSA) and CarboxyMethyl Cellulose (CMC). The proton-conducting polymer may be sulfonated and any suitable equivalent weight of sulfonic acid groups. The porous media may be any sitable type of porous media including, but not limited to, Polytetrafluoroethylene (PTFE), Fluorinated Ethylene Propylene (FEP), Polyolefin films, expanded PTFE, fiberglass, ceramic fiber and polymer fiber.

In an exemplary embodiment, the active ingredient are suitable for electro-osmotic flow, and may comprise silica based material, such as silica gel. Active ingredients may be added in any suitable concentration including, but not limited to, about 0.2% by weight of the compound membrane, about 0.5% by weight of a compound membrane, about 1% by weight of the compound membrane, about 2% by weight of the compound membrane, about 5% by weight of the compound membranes and any range between and including the weight percentages provided.

The compound membrane may have any suitable thickness and preferably has a thickness ranging from about 1 μm to about 25 μm, and may have a thickness less than about 20 um, less than about 15 um, less than about 10 um, and any range between and including the thickness values provided.

The proton-conducting polymer may be cast in and/or on a porous media. A film of proton-conducting polymer may be cast on one or both sides of a porous media and may also substantially fill the pores of the porous media. A fiber reinforcement may be integrated into a compound membrane, including glass fiber. A reinforcing fiber may be added in any suitable step. Reinforcing fibers may have any suitable length including, but not limited to, greater than about 1 mm, greater than about 5 mm, greater than about 10 mm, greater than about 25 mm, greater than about 50 mm and any range between and including the links provided. Reinforcing fibers may be added in any suitable concentration including, but not limited to, about 0.5% by weight of the compound membranes, about 1% by weight of the compound membrane, about 5% by weight of the compound membranes and any range between and including the weight percentages provided.

A method for manufacturing a compound membrane for use in electrochemical devices, comprising the step of: treating a proton-conducting polymer with acetone to obtain a polymer pulp; sulfonating said polymer pulp to obtain a sulfonated polymer pulp; combining at least one active ingredient with said sulfonated polymer pulp; and casting said sulfonated polymer pulp comprising said active ingredient in a porous media to produce a compound membrane. The proton-conducting polymer may be sulfonated prior to this process, or at least partially sufonated.

In one embodiment, the step of treating includes pouring the equivalent of 50 ml of acetone over 5 grams of the proton-conducting polymer in a bottle to produce a solution and keeping the solution for 48 hrs in the container.

In one embodiment, the step of sulfonating the polymer pulp includes heating the equivalent of 50 ml of 95% sulphuric acid and adding the 5 grams of polymer pulp when the temperature of sulphuric acid reaches 100 degree Celsius. The temperature of the sulphuric acid may be maintained between 100 degree Celsius and 110 degree Celsius for a time period equivalent to at least about 15 minutes, or at least about 30 minutes, or at least about 60 minutes, and any range between and including the time periods provided.

In an embodiment, a compound membrane for use in electrochemical devices is disclosed. The compound membrane consists essentially of a proton-conducting polymer cast in a porous media. Further, one or more active ingredients are combined with the polymer.

In another embodiment, a method for manufacturing a compound membrane for use in electrochemical devices is disclosed. The process includes treating a proton-conducting polymer with acetone to obtain a polymer pulp. Then, sulfonating the polymer pulp. Next, combining at least one active ingredient with the sulfonated polymer pulp. Finally, casting the sulfonated polymer pump in a porous media.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including" "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

In the following description, numerous specific details are set forth to provide a thorough understanding of the present disclosure. However, it will be clear to one skilled in the art that the present disclosure may be practiced without some or all of these specific details. In other instances, well known process steps have not been described in detail in order to avoid unnecessarily obscuring the present disclosure.

A membrane for use in electrochemical devices is disclosed. In an embodiment, the membrane consists essentially of a proton-conducting polymer cast in a porous media. Further, one or more active ingredients are combined with the polymer. An electrochemical cell with the compound membrane may be then combined to form an electrochemical compressor device, and then subsequently used in a variety of different refrigeration cycles, such as for example, in a refrigerator, or heat pump, or automobile, or electronic cooling application.

Further, a method for manufacturing the membrane is disclosed. The process includes treating a proton-conducting polymer with acetone to obtain a polymer pulp and subsequently sulfonating the polymer pulp. At least one active ingredient may then be combined with the sulfonated polymer pulp. Finally, the sulfonated polymer pump may be cast in a porous media.

Figure 1:
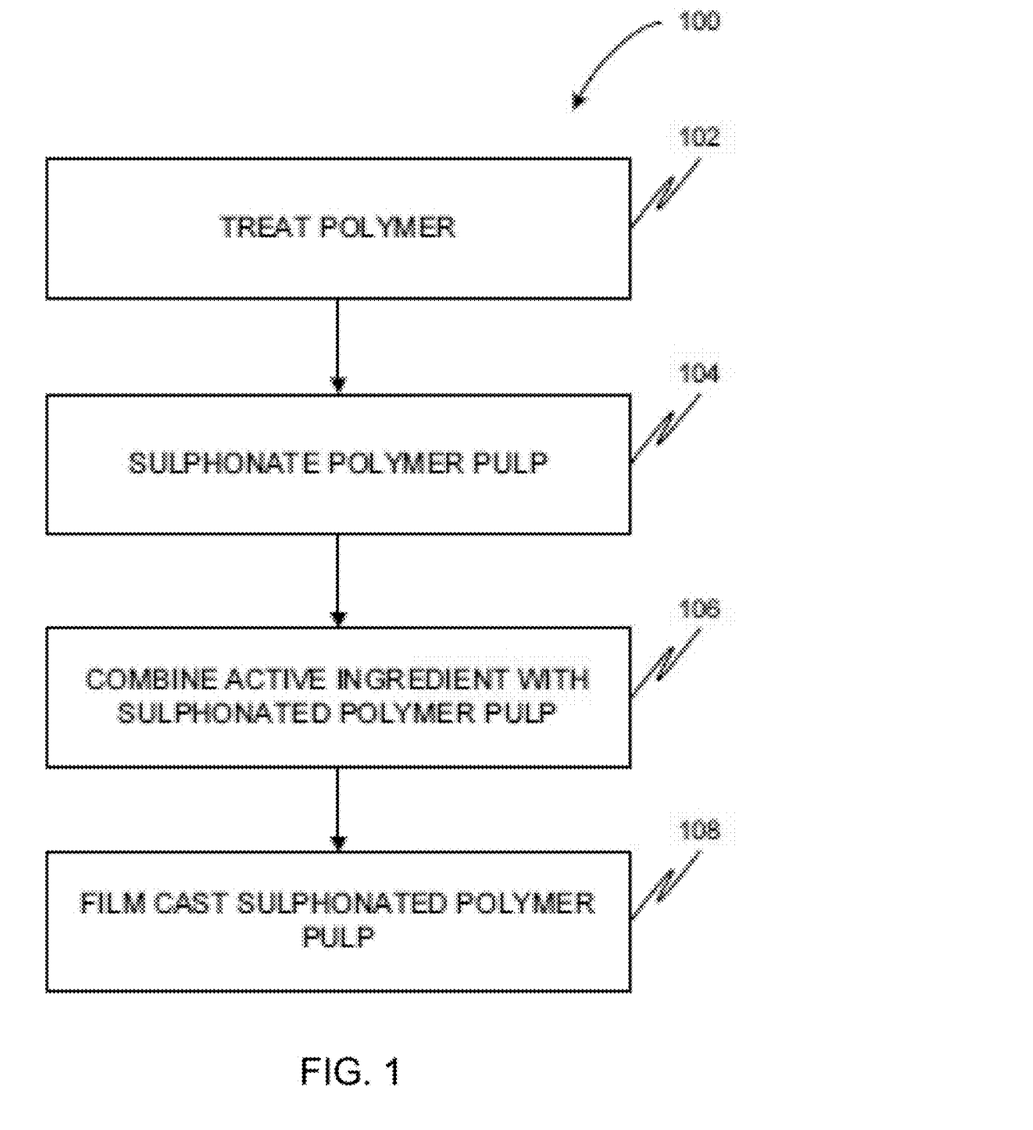
FIG. 1 is flow chart of a method of manufacturing a compound membrane according to an exemplary embodiment of the invention.

Method to Manufacture Compound Membranes:

The compound membranes of the invention can be produced using various customary processes which are known for this purpose to those skilled in the art. FIG. 1 is flow chart of a method 100 of manufacturing a membrane according to an exemplary embodiment of the invention. At step 102, a proton-conducting polymer is treated with acetone to obtain a polymer pulp. The proton-conducting polymer is one of PolyStyrene Sulfonic Acid (PSSA) and CarboxyMethyl Cellulose (CMC). For example, 50 ml of acetone is poured on 5 grams of proton-conducting polymer and the solution is a kept in a 125 ml glass bottle for 48 hrs to obtain a jelly-like polymer pulp.

Next, at step 104, the polymer pulp is sulfonated. This leads to an increase in hydrophilicity and proton conductivity. For example, in the sulfonation process 50 ml of 95% sulphuric acid is heated in a beaker. The temperature of the sulfuric acid within the beaker is measured by immersing a thermometer into the beaker. When the temperature in the beaker reaches 100 degree Celsius, the polymer pulp is put in the beaker. Thereafter, the sulfonation process is temperature controlled at 105±5 degree Celsius. The sulfonation process may be limited to one of 15 minutes, 30 minutes and 60 minutes.

Thereafter, at step 106, at least one active ingredient is combined with the sulfonated polymer pulp. For example, active ingredients that are suitable for electro-osmotic flow such as silica-based materials may be used. The silica-based materials are available in many forms including fine beads, rods, fibers, and films. These may be combined with ionomers in various ratios. Silica gel may be used as an active ingredient. Silica gel is available in various mesh sizes, porosities and purities. Finer particles are preferable as electro-osmotic flow is a surface phenomenon and smaller particles have greater absorption efficiency than the bigger particles due to additional exposed surface obtained by disintegration of particles.

Finally, at step 108, the sulfonated polymer pulp is film cast in a porous media to obtain a compound membrane. Different casting methods generally provide different physical properties. Typically thin films of sulfonated polymer pulp can be brittle; thus it is preferred that they be dissolved in methanol and recast. Films may be cast on glass; however, both CMC and PSSA do not release easily from glass. Therefore, the films may be cast on non-stick surfaces such as Polytetrafluoroethylene (PTFE) or Fluorinated Ethylene Propylene (FEP) or Polyolefin films (like SARAN wrap). Preferably, the films are cast within the matrix of a porous membrane such as a very porous structure of expanded PTFE (with interconnected nodes and fibrils) or another porous media such as polyethylene membrane, polyester substrate or a silicate variant film. A fibrous medium such as fiberglass, ceramic fiber or polymer fiber may also be suitable. Additionally, the ionomer can be cast with fiber reinforcement in the solution, such as fiberglass, PTFE fiber, polymeric fiber or ceramic fiber and the like. The composite ionomer with silica can be cast upon a finely woven or porous glass (or silica based) media to further enhance the electro-osmotic effect.

The ionomers may be reinforced before assembly and/or during operation when solvated. Some reinforcements such as PTFE may in fact impede the migration of refrigerants. Thinner membranes reduce the distance ions need to travel and as a result enhance performance. Reinforcing the membrane allows for ultra-thin membranes (<1 micron) to be formed. An example of suitable glass reinforcement is a thin woven media from Pall referenced as 'emfab tx I 040. Similar materials are also available from other manufacturers like Nittobo in Japan and Burlington Industries in U.S.

Depending on the ionomer(s) used, similar or at least compatible ionomers can be used as binder with catalyst in the electrode for the membrane electrode assembly. Such electrode "inks" can be sprayed onto the membrane or printed onto the membrane or a suitable substrate or even cast and then pressed against the membrane with assured bonding. Further, hybrid membrane electrode assemblies can be envisaged that are optimized for performance and lowest cost. A person skilled in the art may employ a wide array of materials and employ various techniques to accomplish the core requirements of the membrane envisaged in this invention. The examples above are merely illustrations, should not be considered limitations in anyway. Note that ensuring anode and cathode chemical stability is important, and optionally different ionomer(s) blends may be used for different sides.

Compound Membrane

Figure 2:
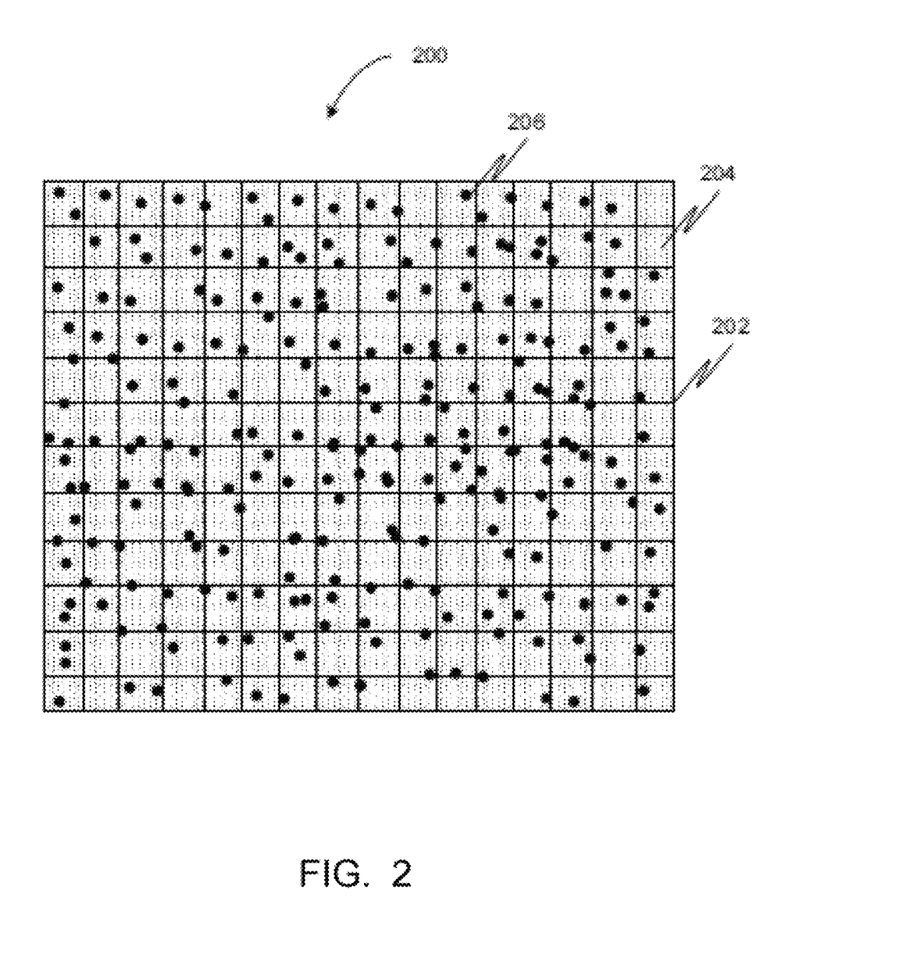
FIG. 2 is a top view of a compound membrane according to the present invention.

FIG. 2 is a top view of a compound membrane 200 according to the present invention. The compound membrane 200 is obtained using the method 100 described in detail in conjunction with FIG. 1 above. The compound membrane 200 is a porous media 202 of the PTFE. The mesh includes sulfonated polymer pulp 204 which is a proton conducting polymer. Further, the sulfonated polymer pulp 204 includes active ingredient 206.

Performance Data of Produced Membranes

Figure 3A:
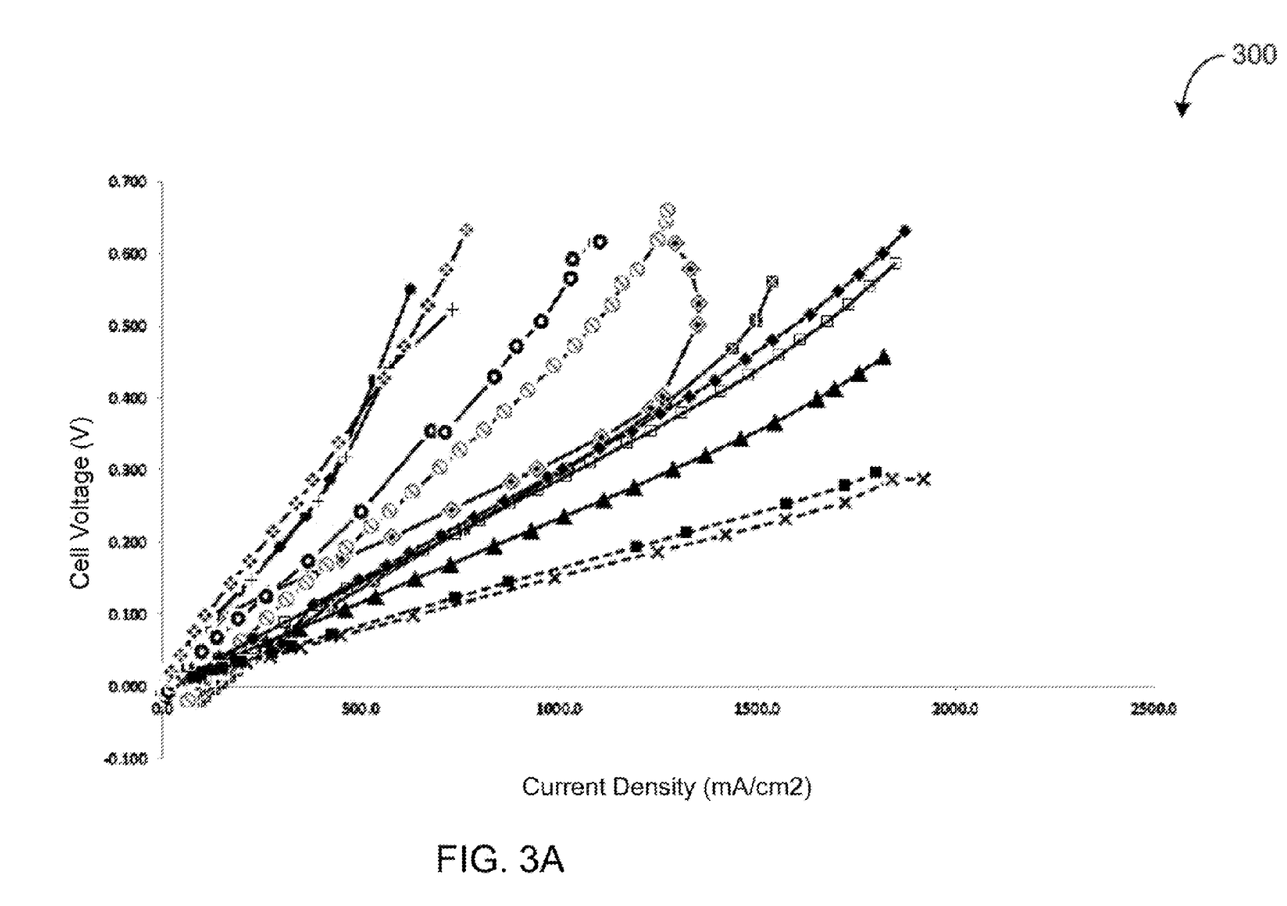
FIG. 3A shows a comparison of the performance data of the conventionally produced membranes with the performance data of the compound membrane of the invention according to an embodiment of present invention.
Figure 3B:
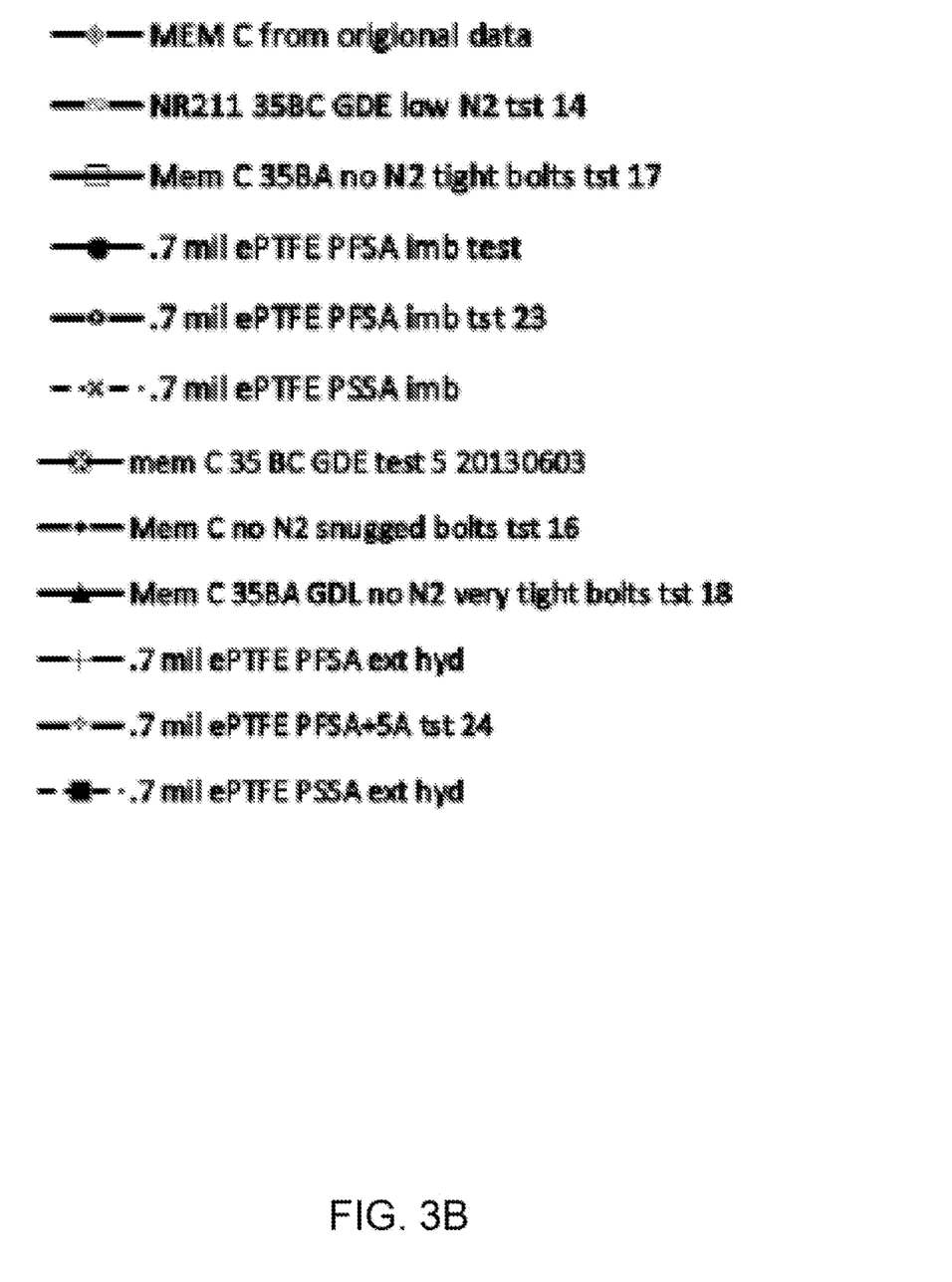
FIG. 3B shows the figure labels for FIG. 3A.

FIGS. 3A and 3B illustrates a graph 300 providing comparison of the performance data of the conventionally produced membranes with the performance data of the compound membranes of the invention according to an embodiment of present invention. Various membranes were manufactured using the method 100 described in conjunction with FIG. 1 above. The current-voltage curves of a cell using these membranes are shown in FIG. 1.

Figure 4:
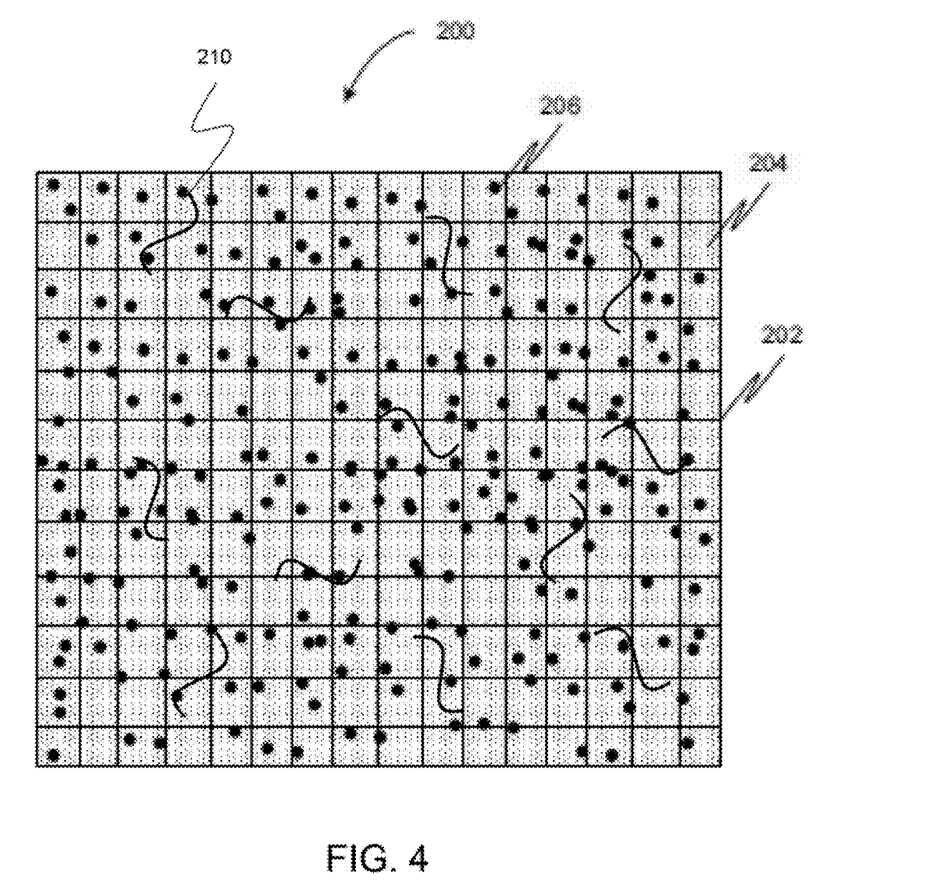
FIG. 4 is a top view of a compound membrane according to the present invention having reinforcing fibers.

FIG. 4 is a top view of a compound membrane 200 according to the present invention having reinforcing fibers 210.

The membranes tested include MEM C from original data, Mem C no N2 snugged bolts tst 16, 0.7 mil ePTFE PFSA imb test, 0.7 ePTFE+5A tst 24, Mem C 35 BC GDE test 5 20130603, Mem C 35BA no N2 tight bolts tst 17, 0.7 mil ePTFE PFSA ext hyd, 0.7 mil ePTFE PSSA imb, NR211 35BC GDE low N2 tst 14, Mem c 35BA GDL no N2 very tight bolts tst 18, 0.7 mil ePTFE PFSA imb tst 23, 0.7 mil ePTFE PSSA ext hyd.

The first tests used Gore select membrane "B" which had very erratic and poor performance. So the membrane was changed to "C". This also had erratic performance producing either virtually no current or close to historical. The presence of dry N2 on cathode side was found to reduce current.

Further, no moisture was observed on Cathode Flow Fields for Mem C and NR211. However, significant moisture was observed for 0.7 mil ePTFE/imbibed 1100 ew Nafion® (A) and very slight moisture (?) was observed for 0.7 mil ePTFE/imbibed 1100 ew Nafion® w Cabosil M5 (B). Further, moisture was observed for 0.7 mil ePTFE/imbibed with PSSA (C).

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A proton conducting membrane for use in electrochemical devices wherein the proton conducting membrane comprises
    a proton-conducting polymer;
    a porous membrane comprising a plurality of pores and consisting essentially of a polymer selected from the group consisting of polytetrafluoroethylene (PTFE), fluorinated ethylene propylene (FEP), polyolefin, expanded PTFE;
    at least one active ingredient comprising silica gel that is suitable for electro-osmotic flow;
    wherein the proton-conducting polymer is imbibed into and substantially fills the pores of the porous membrane; and
    wherein at least a portion of the silica gel is dispersed within the proton conducting polymer of the proton conducting membrane such that the concentration of silica gel dispersed is at least about 0.5% to no more than 5% by weight of the proton conducting membrane.

2. The proton conducting membrane of claim 1, wherein the proton-conducting polymer is selected from the group consisting of PolyStyrene Sulfonic Acid (PSSA) and Car-boxyMethyl Cellulose (CMC).

3. The proton conducting membrane of claim 1, wherein the proton-conducting polymer is sulfonated.

4. The proton conducting membrane according to claim 1, wherein the proton conducting membrane has a thickness ranging from about 1 µm to about 25 µm.

5. The proton conducting membrane of claim 4, wherein the silica gel is at a concentration of at least about 2% by weight of the proton conducting membrane.

6. The proton conducting membrane of claim 1, further comprising reinforcing glass fibers.

* * * * *